United States Patent [19]

Huang

[11] Patent Number: 5,304,048
[45] Date of Patent: Apr. 19, 1994

[54] SCISSOR-ACTION PISTON ROTARY ENGINE WITH DISTRIBUTIVE ARMS

[75] Inventor: Charles C. Huang, 4968 McCoy Ave., San Jose, Calif. 95130

[73] Assignee: Charles Chao-peng Huang, San Jose, Calif.

[21] Appl. No.: 775,477

[22] Filed: Oct. 15, 1991

[51] Int. Cl.$^5$ ............................................. F02B 53/00
[52] U.S. Cl. ...................................................... 418/36
[58] Field of Search .......................... 122/245; 418/36

[56] References Cited

U.S. PATENT DOCUMENTS

| | | | |
|---|---|---|---|
| 1,003,630 | 10/1926 | Morris | 418/36 |
| 1,095,034 | 4/1914 | Sanchez et al. | 418/36 |
| 3,356,079 | 12/1967 | Rolfsmeyer | 418/36 |
| 3,592,571 | 7/1971 | Drury | 418/36 |
| 4,068,985 | 1/1978 | Baer | 418/36 |

Primary Examiner—Michael Koczo

[57] ABSTRACT

A scissor-action piston rotary engine. The engine comprises a cylinder with a pair of rotors which are supported by a mutual main shaft and rotatably housed inside the cylinder. Each of the rotors has a pair of diametrically opposed sector shape pistons with the pistons diametrically intermediately arrayed to form a circular piston-space-piston arrangement. Two pairs of planet gears each with eccentric pins and cranks are linked to the rotors through planet gear housings. Two sun gears with the gear ratio of 2:1 are drivingly engaged to the planet gears. Two pairs of torque transmission arms which are axially offset and diametrically apart by 90° are mounted on the main shaft. Four distributive arms are provided to link the eccentric pins with the torque transmission arms.

4 Claims, 4 Drawing Sheets

SCISSOR-ACTION PISTON ROTARY ENGINE WITH DISTRIBUTIVE ARMS

BACKGROUND OF THE INVENTION

1. Field of Invention

The present invention relates, in general, to a high power density scissor-action piston rotary internal combustion engine and, in particular, to gear-driven mechanism engine with modified kinematic configuration and enhanced reliability due to the addition of distributive arms to the kinematic linkage system. The addition of distributive arms to the kinematic linkage system represents a new and superior kinematic configuration for high performance, scissor-action piston, rotary internal combustion engines.

2. Prior Art

Many versions of scissor-action engines have existed. All such prior scissor-action engine designs have used rotary reciprocal movement between the rotor pistons to provide the four stroke cycle of the internal combustion engine. As the entire rotor assembly rotates relative to the cylinder, the engine is subjected to periodic inertia forces due to the resulting to and fro movement. The no-gear design is a trend of new designs because gears are viewed as the engine component most vulnerable to periodic stress. However, this critical evaluation of gear designs is in error. The main cause of the mechanical failure of past gear designs has been due to the inadequate kinematic configuration of the double rotor engines rather than the utilization of a gear with an optimumly designed kinematic configuration, a gear design is still a very viable alternative to no-gear designs.

SUMMARY OF THE INVENTION

The principal object of the present invention is to restore the gear-driven design as the preferred design for scissor-action piston rotary engines by improving the smooth operation of such engines through an optimumly designed kinematic linkage design.

It also is an object of the present invention to provide such a device with enhanced flexibility to change a design feature by changing one or more parameters of the kinematic linkage design.

Another object is to obtain a scissor-action engine with a high heat efficiency and a wide range torque output. Due to the thermo character of the scissor-action piston engine that features a power gain rather than a power loss in the exhaust stroke and the high transmission efficiency of the gear device, an engine with a high heat efficiency and wide range torque output can be obtained.

The foregoing objects can be accomplished by adding distributive arms to the old gear-driven design of the scissor-action piston, rotary internal combustion engine. Accordingly, the present invention includes a cylinder block with an inner cylindrical bore. The cylinder is closed and sealed at both ends by two identical covers. Two identical rotors, each including a pair of sector shape pistons, are also used. The rotors are rotatably housed inside the cylinder. As the rotors rotate around their mutual axis and reciprocate with respect to each other, the pistons define constantly expanding and contracting variable chambers. The axially extended sleeves of the rotors pass through holes in the cylinder covers and connect via keys and key ways to the planet gear housings. A tandem comprising two identical gear boxes, two identical end covers with sun gears and the above mentioned cylinder block and covers constitute the stationary housing of the whole device. There is a main shaft for power output. The main shaft is fitted into the internal bore of the rotors and journalled with an uniform angular velocity inside the holes of the end covers. Two pairs of axially offset torque transmission arms are alternately separated by 90° angles and are affixed to the main shaft. For reciprocating the rotors with respect to each other, planet gears with eccentric pins are provided in the engine with each gear connected to a corresponding rotor through a corresponding planet gear housing. When the entire rotor assembly is rotated relative to the cylinder, planet gears are drivingly engaged with the sun gears and the eccentric pins, which are integrated into the planet gears, and are connected, either directly as with a past design or indirectly as with this invention, through distributive arms, to the torque transmission arms.

When the mainshaft-rotor assembly rotates relative to the cylinder, the engaged sun-planet gear couples cause the planet gears to rotate around their own axes while they are rotated along the mutual orbits. The eccentric pins attached to the planet gears then cause the pistons to reciprocate about their mated torque transmission arms with one pair of pistons traveling from the trailing side to the leading side of the corresponding torque transmission arms, while another pair of pistons travels from the leading side to the trailing side of the corresponding arms. It is this reciprocating movement of the pistons, with the expansion and retraction of the adjoining spaces of the chambers, that provides the four stroke action of the engine as the entire rotor assembly rotates within the cylinder. As the entire rotor assembly rotates, the movement of all the reciprocating parts of the whole assembly should reach their critical points simultaneously with respect to every 90° rotation of the main shaft relative to the cylinder. Also note that the centers of the planet gears have the same associated velocity as the rotors and that the gear ratio between the sun and planet gears is 2:1. Consequently, the angular travel of the planet gears around their own axes is twice that of the pistons along their orbits. If, and this is the key point of the present invention, the eccentric pins are connected directly to the torque transmission arms, then when a pair of pistons travels from the leading side to the trailing side of the corresponding torque transmission arms, this pair of pistons will travel at less than 90° to travel between two critical points while the corresponding eccentric pins need to travel an angle larger than 180° to travel between two critical points. Likewise, the pair of pistons that travelled from the trailing side to the leading side of the corresponding torque transmission arms would travel an angle larger than 90° while the corresponding eccentric pins would travel an angle of less than 180° between the two critical points. Therein lies the problem for two pairs of pistons and eccentric pins moving at disproportionate angles. This invention solves this problem by using distributive arms connected to the kinematic linkage system in a specific arrangement to create an optimum kinematic design that is described in detail below.

BRIEF DESCRIPTION OF THE DRAWINGS

FIG. 1B shows the initial phase of the stroke: dead point or critical point of the stroke movement; where all the crank arms of the planet gears are perpendicular to the distributive arms.

FIG. 4 shows the geometric relations between the kinematic linkages of the engine shown in FIG. 1B.

DETAILED DESCRIPTION OF THE INVENTION

Figure 1B:
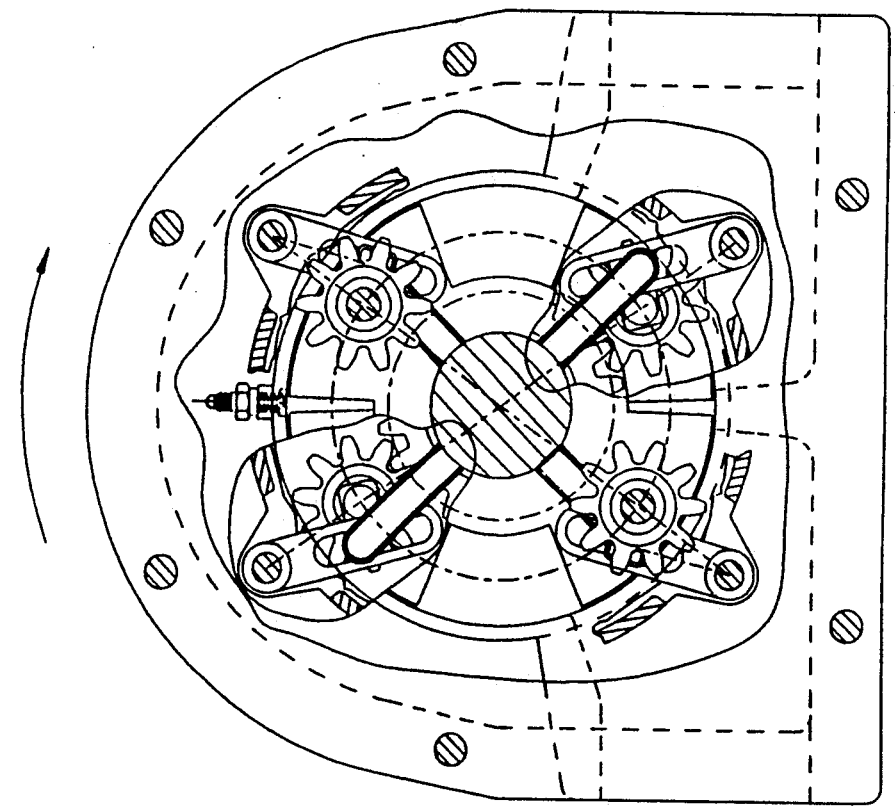
FIG. 1B is the front view similar to FIG. 1A.
Figure 1A:
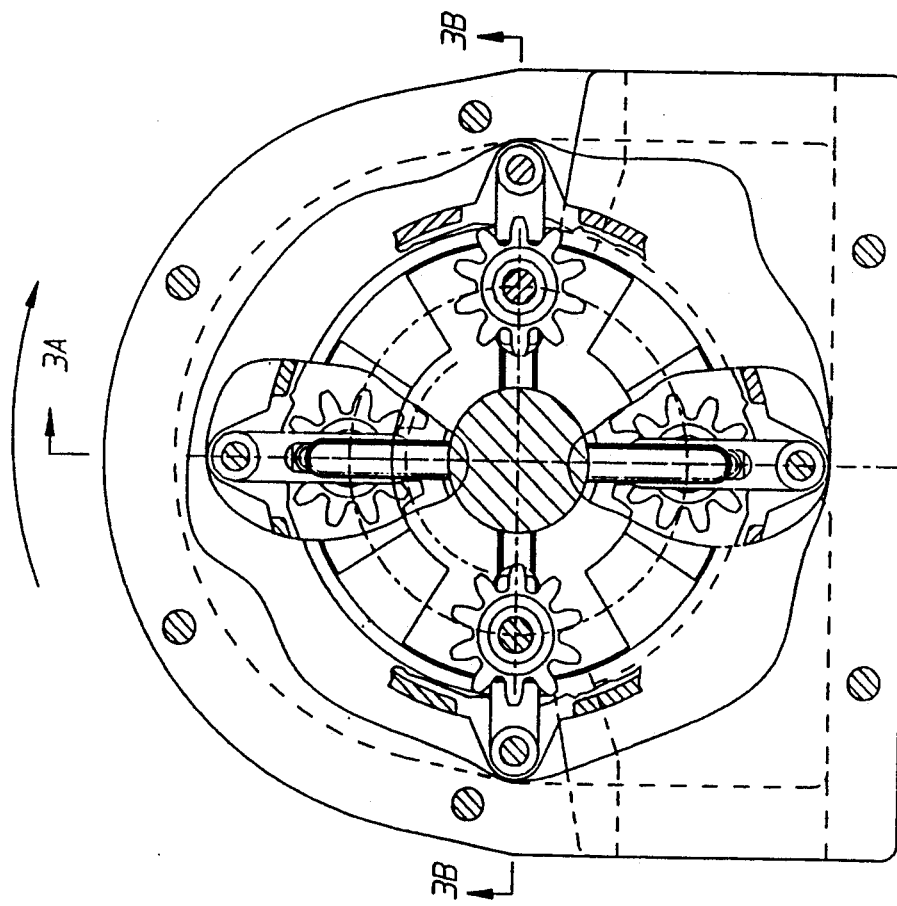
FIG. 1A is the front view of a scissor-action piston rotary internal combustion engine design in accordance with the present invention. The drawing shows the midway point of the stroke movement of the engine, where the axes of the crank arms, distributive arms and torque transmission arms are aligned.
Figure 2:
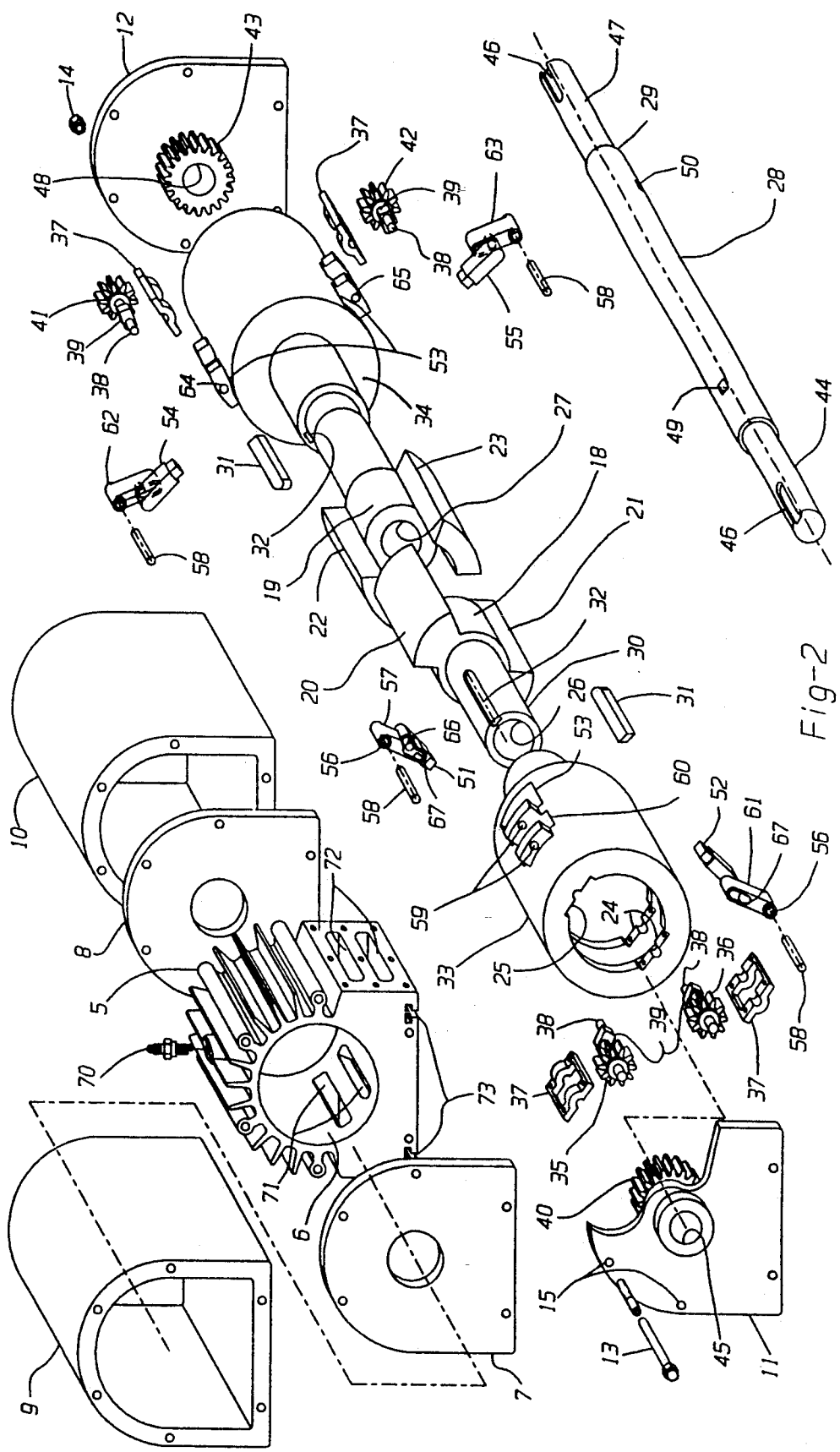
FIG. 2 is an exploded view showing the components of the engine shown in FIG. 1B.
Figure 3:
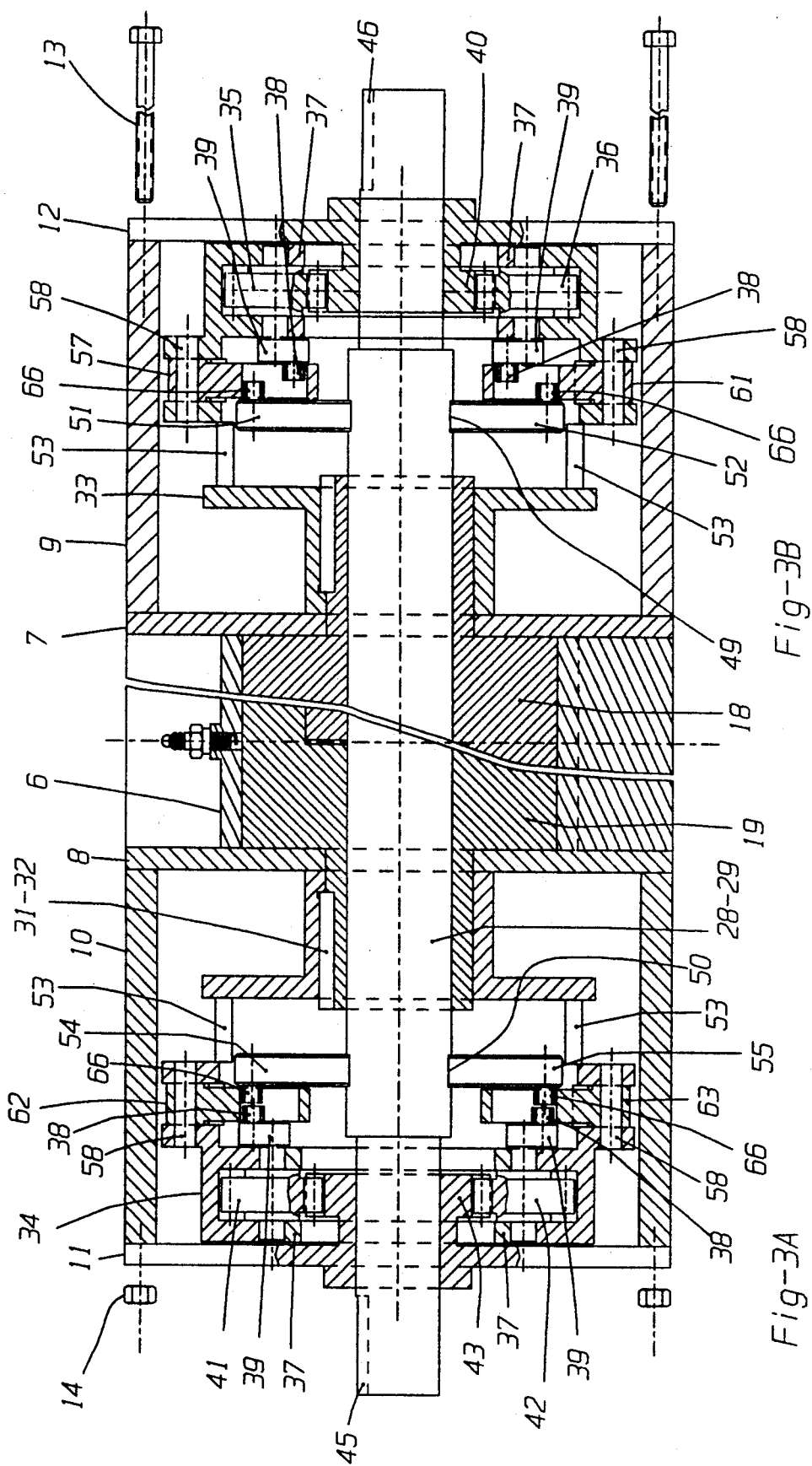
FIG. 3A is an enlarged section view taken substantially in the plane of line 3A—3A on FIG. 1A.
FIG. 3B is an enlarged section view taken substantially in the plane of line 3B—3B on FIG. 1A.

A scissor-action piston, rotary, four stroke, internal combustion engine is shown in the drawings. FIGS. 2 and 3A to 3B show the constituent components and the structural relationships between them. As shown in FIGS. 2 and 3A to 3B, the mechanism includes a series of stationary parts and a series of moving parts. The stationary parts are the cylinder block 5 with inner cylinder bore 6, a front cylinder cover 7, a rear cylinder cover 8, a front gear box 9, a rear gear box 10, a front end cover 11, and a rear end cover 12. All these parts are fastened together by bolts 13 which extend through holes 15 in the stationary parts and by nuts 14 to form a rigid housing for the moving parts. The end surfaces between cylinder block 5 and cylinder covers 7, 8 are machined to a finish sufficient to provide an air-tight seal; other air-tight rotary seals are also provided where necessary. The series of moving parts comprising a scissor-action piston rotor assembly is formed by a pair of co-axial rotor elements 18 and 19. Each element has a pair of sector-shape pistons 20, 21 and 22, 23 respectively. Rotors 18, 19 are rotatably housed within cylinder 6 and are supported by a mutual main shaft 29 via inner bore 26, 27 of rotor 18, 19 and cylindrical surface 28 of main shaft 29. The pistons 20, 21 and 22, 23 are intermediately arrayed to form a circular piston-space-piston arrangement. Sleeve 30 of rotor 18 is extended forward through hole of cover 7 and connected by key 31 and key way 32 to planet gear housing 33, while rotor 19 is extended backward through a hole of cover 8 and is connected by key 31 and key way 32 to planet gear housing 34. For reciprocating the pistons with respect to each other, a pair of planet gears 35, 36 are installed to the 180° apart dual seats 24 and 25 of planet gear housing 33. Each gear is secured by cover 37 and cap screws (not shown) to a corresponding seat and each planet gear has an eccentric pin 38 and crank 39. Finally, each planet gear is drivenly engaged to sun gear 40, while another pair of planet gears 41, 42 are installed with the same manner as planet gears 35, 36 to planet gear housing 34 and drivenly engaged to sun gear 43. The main shaft 29 which supports rotor 18, 19 is axially extended forward through the center hole of planet gear housing 33. One end 44 of main shaft 29 is journalled in hole 45 of end cover 11. Key way 46 and key (not shown) are provided for power output, while another side of main shaft is axially extended backward through center hole of planet gear housing 34. End 47 of main shaft 29 is journalled in hole 48 of end cover 12, key way 46 and key (not shown) are also provided for power output. Main shaft 29 has two mounting holes 49, 50, which are through holes. Axially offset and angularly apart by 90°, a pair of torque transmission arms 51, 52 are installed to hole 49. Access ports 53 are provided in the cylinder wall of part 33 for insertion of the arms to holes 49. Similarly, another pair of torque transmission arms 54, 55 are installed to hole 50 through access ports 53 of housing 34. For reciprocating these two pairs of pistons with respect to each other when the rotor assembly is driven by main shaft 29 and rotated relative to the cylinder or vice versa, these two pairs of pistons reciprocate with respect to each other, the reciprocated movement activating the rotor to drive main shaft 29 to rotate relative to the cylinder. Eccentric pins 38 and cranks 39 of planet gears should connect through appropriated means to torque transmission arms. Here comes the key point of the present invention.

As a rule of this engine, starting from an initial point, the periodic movement of the reciprocating parts should reach their critical point simultaneously with respect to every 90° rotation of the main shaft relative to the cylinder: when the space between two approaching pistons is at its minimum distance, simultaneously, the crank arms 39, which are integrated with the planet gears, are at a perpendicular position with respect to their mated linkage arms. When the main shaft advances 90°, the space between the above mentioned pistons is now at its maximum distance and again the crank arms are in a perpendicular position with respect to their mated linkage arms. To suffice this rule, the stated appropriated means comprising four distributive arms 57 and 61 to 63 connect the eccentric pins 38 and the torque transmission arms 51 to 52 and 53 to 54. The specific arrangement and length ratio of the linkage elements of the crank arms, eccentric pins, distributive arms, and torque transmission arms will be discussed later.

In FIG. 2, the inner bore 56 at one end of the distributive arm 57 is being pinned by pin 58 to hole 59 of housing 33. Another end of arm 57 is extended inward through port 60 of the same housing. Means such as clamp washers (not shown) are provided to hold the pin in place. Similarly, distributive arm 61 is installed to hole (not shown) which is diametrically opposed but identical with holes 59, at the rear side. Distributive arms 62, 63 are likewise installed to holes 64 and 65. With distributive arm 57 in place, eccentric pin 38 of planet gear 36 and pin 66 of torque transmission arm 51 are put oppositely into the slot 67 of distributive arm 57. Slot 67 is deep enough to offset pin 58 with pin 66. After all the elements including linkages in the front and rear sides are likewise installed, we obtain a kinematic diagram shown as FIG. 4.

Figure 4:
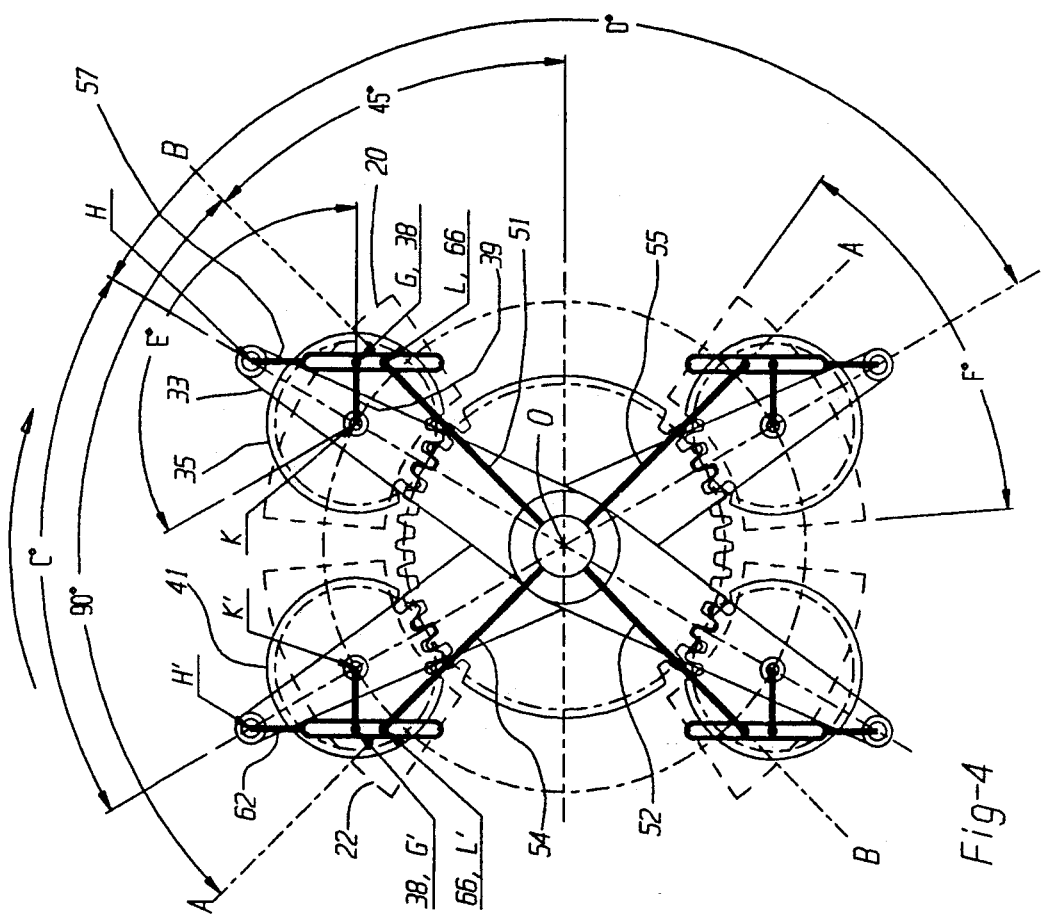
FIG. 4 is a kinematic diagram at the initial phase of the stroke movement.

From FIG. 4 we can study the geometric relationships between the elements of the linkage system. Suppose at the preliminary phase, torque transmission arms 54, 55 sit on line A—A and arms 51, 52 sit on line B—B, which is angularly apart by 90° with respect to line A—A. At this moment, cranks 39 of planet gears 41, 35 are perpendicular to arms 57, 62 respectively and thus reach the dead point of their movement. At the same time, center points k, k' of planet gears 41, 35 are located farthest with respect to arms 57, 62 and co-act by pins 66 to be located farthest from arms 51, 54 respectively. As a result, spaces between the corresponding approaching pistons are minimum.

Let F = extended angle of the piston which is depended on strength of the structure and some other considerations;
R = compress ration which is given by the design specification of the engine;
C = minimum angle between center lines of two approaching pistons;
D = supplement of angle C, we have $$R = (D-F)/(C-F) \quad \text{(1)}$$

$$C + D = 180° \quad \text{(2)}$$

By solving equations (1) and (2), we have:

$$C = (180° + RF - F)/(1+R)$$

$$D = (180°R - RF + F)/(1+R)$$

Notice that the gear ratio between sun gear and planet gear is 2:1. Rotation angle of planet gears 35, 41 around center k' and K is twice as large as rotation angle of pistons around center O. Thus, when arms 54, 53 travel from line A—A to line B—B and accordingly piston 22 travels an angle C, planet gear would rotate an angle E = 2C. From FIG. 4, $\angle GKH = (1/2) E = C$. Finally we have:

$$\cos^{-1}(KG/HK) = C = (180° + RF - F)/(1+R) \quad \text{(3)}$$

where
KG = eccentric value;
HK = offset distance of pin 58 from the center of the planet gear.

With the arrangement mention above, with ratio KG/HK sufficing equation (3) and pistons 20, 21 of one rotor reciprocate oppositely to pistons 22, 23 of another rotor, thereby alternately expanding and contracting the spaces defined between the respective pistons that provide the engine action and power output as the entire rotor assembly rotates within the cylinder.

Some alternatives or modifications can be made to the configuration mentioned above, such as: the sun gear can be mounted on covers 7, 8 other than on end covers 11, 12. Probably this arrangement may simplify the overall configuration. Intermediate blocks may be put between pins 38, 66 and slot 67 to reduce contact stress. Each of the distributive arms may be modified by furnishing thereto a blind slot instead of a through one. This blind slot shall open at one side and is blind on the other side with the open side facing and accommodating the eccentric pin of the planet gear. There is a pin on the blind side of the above mentioned slot of each distributive arm. Also, each of the torque transmission arms is furnished with a slot instead of a pin and the pin in each of the distributive arms operatively engages into the slot of the corresponding torque transmission arm to accomplish the crank arm—distributive arm—torque transmission arm linkage.

Referring to FIG. 2, a spark plug 70 is provided to ignite the compressed gas under scheduled timing, intake port 71 is provided for mixed gas charging and exhaust port 72 is provided for exhaust of the burned gas.

Two T—grooves 73 are integrated to cylinder block 5 for securing the whole device to place where applicable.

A two-stroke scissor-action piston internal combustion engine based on the same principles stated above for a four stroke scissor-action piston, rotary internal combustion engine is also feasible provided additional modifications involving the spark plugs, intake and exhaust ports are made. Referring to FIG. 2, an additional spark plug (not shown) is put symmetrically with spark plug 70 at the other side of the cylinder bore 6, two intake and two exhaust ports (not shown) are placed separately at covers 7 and 8 rather than crowd at the cylinder wall to provide a better scavenging process. Two intake ports are placed in one cover and are connected to a mixed gas compress chamber (not shown). Two exhaust ports are placed in another cover and are connected to an exhaust manifold (not shown).

I claim:

1. A scissor-action piston, rotary four-stroke, internal combustion engine comprising a series of stationary parts housing a main shaft and a rotor assembly, said series of stationary parts comprising a cylinder block with an inner cylinder bore, a front cylinder cover, a rear cylinder cover, a front gear box, a rear gear box, a front end cover having a sun gear thereon, a rear end cover having a sun gear thereon, bolts and nuts which cluster and fasten said series of parts in queue to form a rigid housing, said rotor assembly comprising a pair of identical co-axial rotors with each rotor having a pair of diametrically opposed sector shape pistons, an axially extended sleeve and a center hole, said rotor assembly is centered and supported by said main shaft through said center holes and journaled in said cylinder bore, with the pistons of one rotor intermediately interlaced with the pistons of the other to form an alternate piston-space-piston arrangement, each of said sleeves extends outwardly from said cylinder bore in opposite directions, two planet gear housings with each housing connected through a key and keyway to each of said extended sleeves, said main shaft extended axially forward and backward, fitted and journalled within the center holes of said end covers, two keys and two keyways are furnished at both ends of the main shaft for power output, means joining said main shaft to said sleeves for reciprocating said rotors with respect to each other as said rotor assembly rotates with respect to said cylinder, said means comprising four planet gears with each gear having an eccentric and a crank arm thereon, said planet gears are installed to said planet gear housings and are drivingly engaged with said sun gears of said end covers, the gear ratio between said sun gears and said planet gears is 2:1, two pairs of axially offset torque transmission arms are mounted to said main shaft, each of said torque transmission arms is set diametrically apart by 90°, intermediate means comprising four sets of distributive arms connect said crank arms to said torque transmisstion arms, each distributive arm is pivoted on said planet gear housing and has an elongated slot for accommodating the eccentric pin of said crank arm and the pin of said torque transmission arm, the arrangement stated above along with a spark plug, an intake port and an exhaust port around the cylinder wall, thereby effecting rotational reciprocated movement between said rotors and thereby the pistons attached thereon for providing compression and expansion spaces between said pistons and establishing intake, compression, ignition, expansion and exhaust processes of the four stroke internal combustion engine while said main shaft is rotated uniformly.

2. A scissor-action piston engine as defined in claim 1 wherein said intermediate means comprise four distributive arms which are pinned on specific locations of the planet gear housing, the following equation represents this specific arrangement: $COS^{-1}(KG/HK)=C$ where the gear ratio between said sun gear and said planet gear is 2:1;

KG = distance between the centers of planet gear and pin hole for installing the distributive arm;

HK = eccentric value;

C = minimum angle between the center lines of two approaching pistons, this angle can be obtained by following equations:

$$R=(D-F/C-F) \qquad (1);$$

$$(C+D)=180° \qquad (2)$$

where R = given compression ratio of the engine;

F = given extended angle of the piston;

D = supplement of angle C, said distributive arms each has an elongated slot, eccentric pin and corresponding pin of the torque transmission arm, each with intermediate sliding block which is slid mutually inside the slot but are axially offset.

3. A scissor-action piston engine as defined in claim 2 with the modification of torque transmission arms and distributive arms where each distributive arm has a blind slot which opens at one side and is blind at the other side, the open side of slot faces and accommodates the eccentric pin of the planet gear, and a pin is furnished at the blind side of said slot of each distributive arm, also a slot is furnished for each of the torque transmission arms, the pin in each of the distributive arms operately engages the slot of the corresponding torque transmission arm, thereby establishing the crank arm-distributive arm-torque transmission arm linkage.

4. A scissor-action piston rotary two stroke internal combustion engine as defined in claim 2, having additional spark plug which is diametrically opposed to the existed one, a pair of intake ports located at one cylinder cover and connected to the intake gas compression chamber, and a pair of exhaust ports located at another cylinder cover and connected to the exhaust gas manifold.

* * * * *